United States Patent [19]

Schuermann et al.

[11] 4,001,942
[45] Jan. 11, 1977

[54] ROD EXTENSOMETER

[75] Inventors: Fritz Schuermann, Hattingen;
Herbert Müller; Horst Böddicker,
both of Essen, all of Germany

[73] Assignee: Bergwerksverband GmbH, Essen,
Germany

[22] Filed: May 29, 1975

[21] Appl. No.: 582,417

[30] Foreign Application Priority Data

May 30, 1974 Germany .......................... 2426088

[52] U.S. Cl. .............................. 33/125 B; 33/1 H;
73/88 E
[51] Int. Cl.[2] ......................................... G01B 5/00
[58] Field of Search .......... 33/1 H, 125 B; 73/88 E,
73/88 F; 116/DIG. 34

[56] References Cited
UNITED STATES PATENTS

| | | | |
|---|---|---|---|
| 3,404,460 | 10/1968 | Livingston et al. | 33/125 B |
| 3,885,423 | 5/1975 | Schuermann et al. | 33/125 B X |

FOREIGN PATENTS OR APPLICATIONS 1,025,729  4/1966  United Kingdom .............. 73/88 E

*Primary Examiner*—Charles E. Phillips
*Attorney, Agent, or Firm*—Michael J. Striker

[57] ABSTRACT

A rod extensometer which can be inserted into a hole drilled into the roof or floor of an underground excavation to monitor the shifting of material surrounding the excavation. The extensometer has a head which is anchored in the inner end portion of the hole by a hardened synthetic plastic substance, an annular section which is inserted into the outer end portion of the hole and is bonded to surrounding material, and a set of interconnected coaxial cylindrical rods one of which is rigid with the head and another of which extends through the annular section. Changes in distance between the outer end of the other rod and the annular section are indicative of movement of material surrounding the inner end portion of the hole relative to material surrounding the outer end portion of the hole and/or vice versa. The head has an externally threaded member which is bonded to the surrounding material and a blade-like or conical breaker member located forwardly of the externally threaded member and serving to break a cartridge which contains separate supplies of a hardenable synthetic plastic bonding substance and a hardening agent for such substance. The annular section of the extensometer has a nut and washer which abuts against the exposed surface of material bounding the outer end portion of the hole, and the outer end of the other rod has flats which can be engaged by a torque transmitting device serving to rotate the rods and the head. Two identical or dissimilar extensometers can be installed in two coaxial holes to facilitate additional measurements, such as changes in the distance between the two heads, changes in the distance between the two nuts, as well as changes in the distance between each head and the respective nut.

6 Claims, 3 Drawing Figures

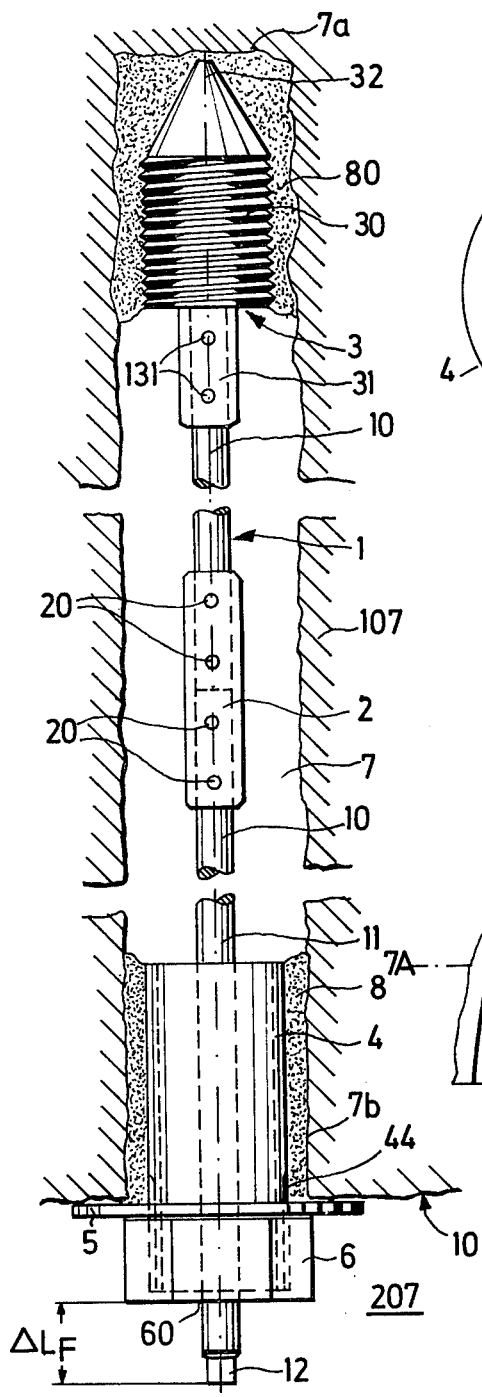
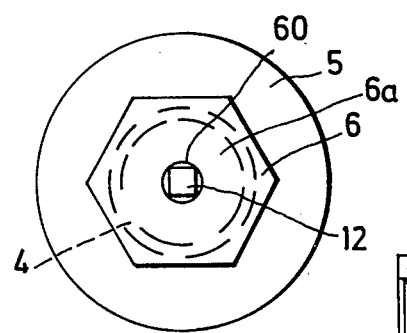
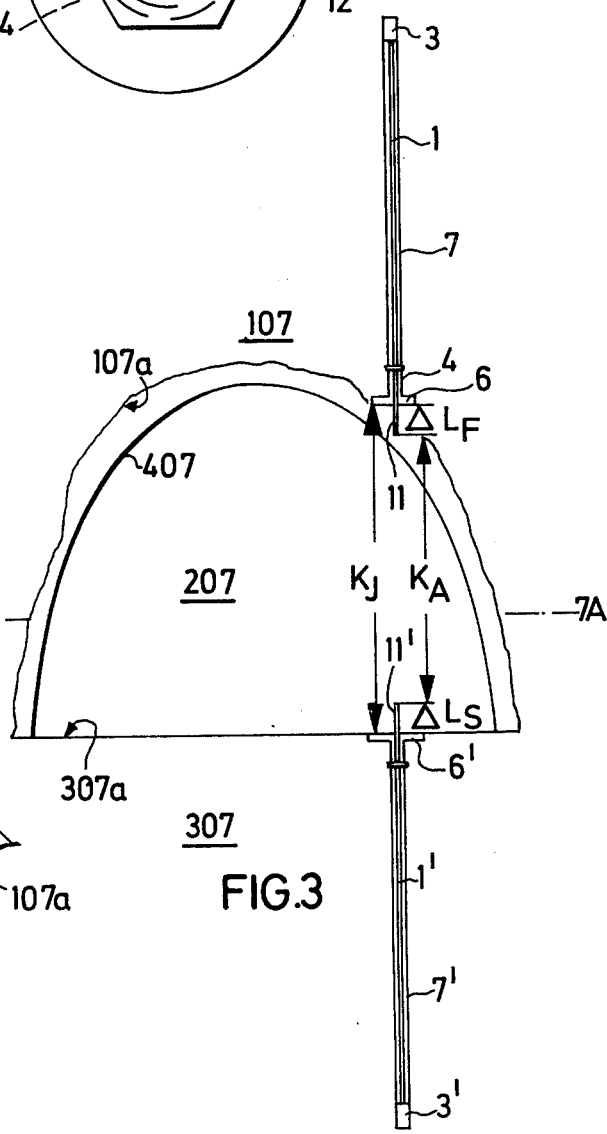

ROD EXTENSOMETER

BACKGROUND OF THE INVENTION

The present invention relates to extensometers in general, and more particularly to improvements in so-called rod extensometers which can be used with advantage to monitor eventual shifting of strata of rock, ore or other material surrounding a tunnel or another underground excavation.

Certain types of presently known rod extensometers are described, for example, in Prospektblatt Interfels published in 1970 by Internationale Versuchsanstalt fuer Fels in Salzburg, Austria, Datenblatt 2.5, sheets 1, 3, 3a and 3b. Such extensometers are particularly suited for precise measurements of minute shifting of strata of soil, rock ore or like material around a tunnel or another underground excavation. A drawback of presently known extensometers is that they are rather bulky, complex and expensive. Also, presently known rod extensometers comprise a large number of component parts and few of such parts can be recovered upon completion of measurement in a particular region of the excavation. Still further, owing to the bulk of known extensometers, they can only be installed in holes having relatively large diameters; the drilling of such holes in rock or ore is expensive and time-consuming since the length of a hole may be in the range of several hundred meters.

Systematic monitoring of movements of material around an underground excavation is important and desirable in coal mines and similar plants. Such monitoring is necessary to determine the magnitude of stresses which are applied by surrounding material to the frame structure or lining in the excavation, especially in an excavation which is to be used for a relatively short period of time and is dug into material exhibiting a strong tendency to shifting. There exists an urgent need for extensometers which are relatively inexpensive so that they can be used in groups of two or more and which can be rapidly installed in or removed from holes drilled into material around an underground excavation in a coal mine or the like.

SUMMARY OF THE INVENTION

An object of the invention is to provide a novel and improved extensometer which is simpler, easier to manipulate, more compact and less expensive than heretofore known extensometers.

Another object of the invention is to provide a rod extensometer which can be installed in a hole having a small diameter and the major part of which can be recovered when the locus of measurement is to be transferred to another portion of an underground excavation.

A further object of the invention is to provide a rod extensometer with a novel and improved head adapted to be inserted into and anchored in the inner portion of a hole which is drilled into the material surrounding an underground excavation.

An additional object of the invention is to provide a novel and improved rod assembly for use in the above outlined extensometer.

A further object of the invention is to provide a novel and improved apparatus which is assembled of two or more extensometers and facilitates the monitoring of several types of movements of material around an underground excavation.

Still another object of the invention is to provide an apparatus which can be used for systematic monitoring of movements of material surrounding a tunnel or another underground excavation.

Another object of the invention is to provide a novel and improved method of monitoring the movements of material surrounding an underground excavation in a coal mine or the like.

One feature of the invention resides in the provision of an improved rod extensometer which can be used for measurement of shifting of the strata of rock, ore or similar material while being inserted into a hole which is drilled into such material and has an outer end portion communicating with an underground excavation and an inner portion remote from the outer end portion. The extensometer comprises an annular section which is bonded (by adhesive or a hardened synthetic plastic substance) to the material surrounding the outer end portion of the hole, an anchoring head having an externally threaded or otherwise profiled member bonded to the material surrounding the inner portion of the hole and a breaker member (e.g., a blade or conus) whose cross section decreases in a direction away from the annular section (the threaded member of the head is disposed between the breaker member and the annular section), and an elongated rod assembly having a first end portion affixed to the head and a second end portion movably extending through the annular section so that longitudinal displacements of the second end portion of the rod assembly relative to the annular section or vice versa indicate changes in the distance between the material surrounding the inner portion and the material surrounding the outer end portion of the hole.

The rod assembly preferably comprises a plurality of discrete cylindrical rods which are disposed substantially end-to-end and means (e.g., collars and pins) for coupling the rods to each other so that the rods can rotate the head in response to the application of torque to that (outermost) rod which constitutes the second end portion of the rod assembly. The outermost rod is preferably formed with a polygonal outer end portion having two or more flats and being accessible in the excavation (i.e., at the outer end portion of the hole) for the application of torque to the rod assembly and the anchoring head.

The annular section of the extensometer may comprise a tube which is directly bonded to the material surrounding the outer end portion of the hole and has external threads, a washer which surrounds the tube and abuts against the material at the outer end portion of the hole, and a nut meshing with the tube and urging the washer against the material at the outer end portion of the hole. The second end portion of the rod assembly may extend with substantial clearance through the tube of the annular section and with minimal or with much smaller clearance through a centering and rod-guiding opening in the nut.

Another feature of the invention resides in the provision of an apparatus which measures the shifting of strata of rock, ore or similar material surrounding an underground excavation and being formed with coaxial first and second holes (which may be vertical with one thereof drilled into the floor and the other thereof drilled into the roof of the excavation) each having an outer end portion communicating with the excavation and an inner portion remote from the excavation. The apparatus comprises discrete first and second extensometers each having a head received in the inner portion of the respective hole and bonded to material surrounding the respective inner portion, an annular section received in the outer end portion of the respective hole and bonded to the material surrounding the respective outer end portion, and a rod assembly having a first end portion affixed to the respective head and a second end portion slidably extending through the respective annular section. The displacement of each second end portion relative to the respective annular section are indicative of changes in distance between the material surrounding the outer end portion and the material surrounding the inner portion of the respective hole. The displacements of the two annular sections relative to each other are indicative of changes in the distance between the outer end portions of the two holes, and the displacements of the second end portions of the two rod assemblies with respect to each other are indicative of changes in the distance between the two heads.

At least one of the extensometers may be constructed and assembled in the same way as described above in connection with the first feature of the invention. The two holes may be perpendicular to stratification of material which surrounds the excavation.

If desired or necessary, the material surrounding the excavation may be formed with coaxial third and fourth holes which may be normal to the first and second holes and which respectively receive third and fourth extensometers cooperating with each other in the same way as the first and second extensometers.

The novel features which are considered as characteristic of the invention are set forth in particular in the appended claims. The improved extensometer itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary elevational view of an extensometer which embodies one form of the invention and is installed in an upwardly extending hole drilled into the roof of an underground excavation;

FIG. 2 is a bottom plan view of the extensometer shown in FIG. 1; and

FIG. 3 is a diagrammatic view of an apparatus employing two extensometers of the type shown in FIGS. 1–2.

DESCRIPTION OF THE PREFERRED EMBODIMENTS

FIGS. 1 and 2 show a rod extensometer which embodies one form of the invention and is installed in a vertical hole 7 extending into the material of the roof 107 of an underground excavation 207. The surface below the open lower end portion 7b of the hole 7 is shown at 107a and the deepmost (uppermost) or inner portion of the hole is shown at 7a. The improved extensometer comprises a composite rod assembly 1 including a plurality of discrete coaxial rods 10 and 11 having cylindrical peripheral surfaces and being separably coupled to each other by elongated collars or muffs 2 and diametrically extending pins 20. The rods 10 and 11 are disposed substantially end-to-end. The lowermost or outermost rod 11 of the rod assembly 1 has a polygonal lower end portion 12 which extends into the excavation 207 and is accessible for engagement by a wrench or a similar tool which is to be used to rotate the rod assembly in the hole 7. The end portion 12 which is shown in FIGS. 1–2 has a square outline; however, it is equally within the purview of the invention to employ a hexagonal or other polygonal end portion or to provide the lower end face of the outermost rod 11 with a recess bounded by a polygonal internal surface. Furthermore, the lower end portion of the rod 11 may have internal or external threads. All that counts is to insure that the entire rod assembly 1 can be readily rotated in response to the application of torque to that end portion of the outermost rod 11 which extends into the excavation 207 or is accessible to a person in this excavation.

The uppermost rod 10 of the assembly 1 carries a sleeve-like holder 31 which is secured thereto by pins 131 and carries a novel anchoring head 3. The head 3 includes an externally threaded member 30 preferably having a constant diameter, and an upwardly tapering wedge-like or conical breaker member 32. The head 3 is fixedly anchored in the inner portion 7a of the hole 7 by synthetic plastic material which forms a shell 80 adhering to the surface surrounding the portion 7a of the hole 7. Such anchoring can be effected in the following way:

Prior to insertion of the rod assembly 1 and head 3, the hole 7 receives one or more cartridges each having twin chambers which are normally sealed from each other. One of the chambers in each cartridge is filled with a synthetic plastic material and the other chamber in each cartridge is filled with a hardening agent which, when mixed with the plastic material, causes the latter to harden and to thus form the shell 80. Either chamber or both chambers of each cartridge may contain additional materials, such as a suitable filler or the like. Once the cartridge or cartridges are properly introduced into the inner portion 7a of the hole 7, the rod assembly 1 is inserted into the hole 7 from below and is forced upwardly so that the breaker member 32 destroys the partition or partitions between the chambers of each cartridge. At the same time, or subsequent to destruction of the just mentioned partition or partitions, the rod assembly 1 is rotated by applying torque to the lower end portion 12 of the outermost rod 11 so that the externally threaded member 30 of the head 3 effects a thorough intermixing of hardening agent with the synthetic plastic material. The latter hardens and forms the shell 80 which bonds the head 3 to material surrounding the inner portion 7a of the hole. Thus, once the material of the shell 80 has set, the head 3 is compelled to share all movements of the material around the portion 7a of the hole 7 toward or away from the excavation 207.

The outer end portion 7b of the hole receives an annular section including a tube 4 which is anchored in the material of the roof 107 by a second shell 8 which may consist of a suitable adhesive or which may be formed in the same way as the shell 80. Thus, the tube 4 is compelled to share all movements of the surface 107a toward or away from the head 3 as soon as the material of the shell 8 has set sufficiently to bond the tube to the surface surrounding the outer end portion 7b of the hole 7.

The lowermost portion of the tube 4 extends into the excavation 207 and is surrounded by a washer-like annular member 5 which is maintained in abutment with the surface 107a by a nut 6 having internal threads in mesh with external threads 44 on the lower end portion of the tube 4. The internal diameter of the tube 4 may greatly exceed the diameter of the outermost rod 11; the latter is guided in an inwardly extending guide portion 6a of the nut 6 which has an axial centering opening 60 for the rod 11. Variations in the distance ($\Delta L_F$) between the plane of the underside of the nut 6 and the lower end face of the polygonal end portion 12 are indicative of relative movement between the head 3 (and rod assembly 1) and the section 4–6. Such variations may be detected by resorting to a suitable gauge (not shown) of any conventional design.

If desired or necessary, the section 4–6 may be completely concealed in the outer end portion 7b of the hole 7; it is also within the purview of the invention to omit the washer 5 and the nut 6 and to utilize a gauge which measures variations in distance between the underside of the tube 4 (which is assumed to be fully received in the outer end portion 7b of the hole 7) and the lower end face of the outermost rod 11. Such mode of installing the improved extensometer is advisable when the protruding parts (such as 5 and 6 shown in FIG. 1) are likely to cause injury to persons or damage to equipment in the excavation 207. The outer diameter of the washer 5 can be greatly reduced so that it equals or is even less than that of the tube 4.

An advantage of the breaker member 32 is that it can readily break a cartridge which contains the material for the making of shell 80. Cylindrical rods (10,11) are preferred because they can transmit to the anchoring head 3 substantial torque even if the rod assembly 1 is very long (e.g., 20 meters) and even if the diameters of rods are small so that the entire extensometer can be installed in a small-diameter hole. The bonding of tube 4 to the surrounding material by shell 8 reduces the likelihood of cracking and fragmentizing of material around the outer end portion 7b of the hole 7. The means for measuring the distance $\Delta L_F$ (e.g., a guage stick) may be of conventional design.

FIG. 3 shows an apparatus which comprises two mirror symmetrical extensometers each constructed in a manner as shown in and described in connection with the extensometer of FIGS. 1–2. The material of the floor 307 of the excavation 207 is formed with a vertical hole 7' which receives the second extensometer including the rod assembly 1' having an outermost rod 11', and a section including a nut 6'. The hole 7 is coaxial with the hole 7'. The reference character 407 denotes schematically a frame structure which is installed in the excavation 207 to prevent collapse of the roof 107 and which must take up stresses developing when the distance between the heads 3, 3' increases or decreases and/or when the distance between the nuts 6 and 6' increases or decreases. The apparatus of FIG. 3 can determine variations of the distance ($\Delta L_F$) between the head 3 and nut 6, variations in the distance ($\Delta L_S$) between the head 3' and the nut 6', variations in the distance ($K_A$) between the exposed end faces of the outermost rods 11, 11', and/or variations in the distance ($K_J$) between the exposed end faces of the nuts 6 and 6'. The variations of distance $K_A$ indicate the extent to which the inner end portions of the holes, 7, 7' approach or move away from each other, and variations in the distance $K_J$ indicate the extent to which the exposed surfaces of the roof 107 and floor 307 move nearer to or away from each other.

Several pairs of extensometers can be installed in the excavation 207 one behind the other to monitor the shifting of material around the excavation in the longitudinal direction of the excavation. Furthermore, two or more pairs of extensometers can be installed in the excavation 207 side-by-side to monitor the shifting of different portions of the roof 107 and floor 307 in a particular part of the excavation. Also, a first pair of coaxial extensometers can be installed in a manner as shown in FIG. 3, and a second pair of extensometers can be installed in holes whose common axis (indicated at 7A) is normal or otherwise inclined with respect to the common axis of the holes 7 and 7'. Such mounting of pairs of extensometers further contributes to reliability of measurements which are to be carried out in order to determine shifting of material around the excavation and to thus facilitate the prognosis regarding the behavior of such material while the excavation is still in use. Thus, the persons in charge of evaluating the results of measurements can calculate or estimate in advance the likely development of forces acting upon the frame structure 407 so that the operators of the mine are in a position to reinforce the frame structure, if necessary, or to evacuate the excavation if the forces are likely to rise to such an extent that the frame structure would be unable to prevent a cave-in.

The holes in the material surrounding the excavation 207 may but need not be drilled at right angles to stratification of such material, e.g., a vein of coal, rock or the like.

The means for measuring the distances $\Delta L$, $K_A$ and $K_J$ are of conventional design. Such measuring means may be gauge sticks, dial gauges or the like.

The improved extensometer or extensometers can be used with advantage for systematic monitoring of movements of (and/or of pressures in) the material which surrounds underground excavations having a relatively short useful life (e.g., in coal mining) and/or to monitor shifting of different layers or zones of material which is expected to perform pronounced movements, either as a result of digging or as a result of changes in pressures or stresses which develop independently of digging. As mentioned above in connection with FIG. 3, the improved extensometer, when used in conjunction with one or more additional extensometers, can monitor variations in the distances $\Delta L_F$, $\Delta L_S$, $K_A$ and $K_J$. The variations of $\Delta L_F$ or $\Delta L_S$ indicate relative movements of material at the inner and outer ends of the respective holes; such variations can be positive or negative, i.e., the head of an extensometer can move away from or nearer to the respective tube. The (positive or negative) variations of $K_J$ indicate that the material of the roof 107 moves relative to material of the floor 307 or vice versa, and the (positive or negative) variations of $K_A$ indicate that the distance between the two heads of both coaxial extensometers has changed. Such data can be readily evaluated to predict, with a high degree of accuracy and reliability, the behavior of material around the excavation.

In many or most instances, movements which are indicative of loosening of the material around an underground excavation begin to take place close to the excavation (in the example shown in FIG. 3, such movements are likely to take place first in the roof 107 and/or in the floor 307 immediately adjacent to the frame structure 407). With time, such loosening (and resulting weakening) progresses deeper into the material, i.e., toward the inner portion of the hole 7 and/or 7'. The speed of penetration is a function of time and it also depends on the nature (e.g., stratification) of material around the excavation. The deformations may be purely elastic (such deformations are a function of the pressure of rock above the excavation and of the strength or stability of the material), predominantly or mainly elastic, or a result of breakage and incipient collapse. Furthermore, and especially in mining regions where the material into which an excavation is to be dug exhibits the tendency to develop pressures or internal stresses, breakage often leads to the formation of wrinkling or folding which, for all practical purposes, is tantamount to a collapse of the material (termination of its ability to withstand stresses). The just discussed complex relationships between various types of shifting of material surrounding an excavation can be readily monitored and the future behavior predicted by resorting to one or more pairs of extensometers which cooperate in a manner as described in connection with FIG. 3. Two important factors must be borne in mind while evaluating the results of measurements which can be carried out by resorting to a pair of coaxial extensometers. First, as a rule, the heads 3 and 3' of the extensometers are unlikely to remain in one and the same position. Thus, the distance between the heads 3 and 3' can decrease because the aforediscussed loosening of material has progressed from the surfaces 107a, 307a and all the way to the inner portions of the holes 7 and 7'. This is normally indicative of completed transition of material into a state of breakage. Alternatively or in addition to such propagation of loosening toward the inner portions of the holes 7 and 7', the heads 3 and 3' can move nearer to each other because the pressure of material increases (e.g., the weight of material above a freshly dug stretch of the excavation exceeds the weight of material above a preceding portion of the excavation).

Secondly, the distance between the heads 3 and 3' tends to increase, first at a rapid rate and thereupon more gradually but still irregularly, as a result of erection of a frame structure 407 in the excavation and the resulting balancing of stresses. Moreover, such increase in the distance between the heads 3 and 3' takes place simultaneously with (i.e., it overlaps in time with) a shortening of the distance as a result of pressure of material or simultaneously with an increase in distance between the heads 3 and 3' as a result of a reduction of material pressure.

It can be said that the results of measurements carried out with the improved extensometers are related to the behavior of the material surrounding an excavation or tunnel in the following manner:

If the distance $\Delta L_F$ and/or $\Delta L_S$ decreases only slightly (by less than 10 mm), the behavior of the material surrounding the frame structure 407 can be assumed to be normal. If the distance between the heads 3 and 3' remains substantially unchanged, this represents the phase 1 according to disclosure by H. O. Lütgendorf in "Quantitative Gebirgsmechanik der Untertagbauten in geklüftetem Gebirge" (published in Fachbuch, Glückauf-Verlag, 1971).

If the distance $K_J$ remains substantially constant or decreases only negligibly but the distance $\Delta L_F$ or $\Delta L_S$ decreases substantially (by more than 10 mm), the material around the excavation exhibits the tendency to break.

If the distances $K_J$ decreases more than the distance $K_A$, the material reaches the phase 2 as described in the aforementioned publication by Lutgendorf. If $\Delta L$ has decreased less than 100 mm, no wrinkling or folding will take place; such wrinkling will occur if $\Delta L$ has decreased more than 100 mm.

If the distance between the heads 3 and 3' decreases simultaneously with a increasing of $\Delta L_F$ and $\Delta L_S$, the pressure of the material around the excavation increases. If $\Delta L_S$ and $\Delta L_F$ of the extensometers are decreasing and the distance between the heads 3, 3' increases, the pressure of material around the excavation decreases.

The combination of measurements of changes in the length of discrete extensometers with a measurement of the distance between the heads 3 and 3' renders it possible, for the first time, to distinguish the deformations which are due to changes in pressure of material around the excavation from normal deformations which are due to a reduction of stresses as a result of interaction between the material around the excavation and the frame structure in the excavation. Thus, instead of being compelled to rely on empirically determined results, one can now predict the behavior of material around the excavation with a surprisingly high degree of reliability. The importance of such predication of material behavior to the operators of a coal mine or the like will be readily appreciated.

The measurements of variations of $K_J$, together with eventual measurements of lateral shifting of the exposed end portions of rods 11, 11' relative to each other furnish additional valuable information at a relatively low cost. Measurements of lateral shifting of rod 11 relative to rod 11' and/or vice versa will indicate the presence of strains in the relatively thin layer of material which is immediately adjacent to the surface 107a and/or 307a.

The improved extensometers render it possible to point at a reduction of rock pressure when the distance between the heads 3 and 3' begins to increase. The increasing pressure of rock is determined by noting that the distance between the heads 3 and 3' decreases. This is normally sufficient in an average mining plant because, once the results of measurements are known, the personnel in charge can undertake measures and make decisions which, in accordance with the heretofore known procedures, had to be undertaken exclusively on the basis of empirically obtained measurements, i.e., in most instances too late to avoid damage, injury or both.

The improved extensometer can be modified in a number of additional ways without departing from the spirit of the invention. Furthermore, the measurements which have been described in connection with FIG. 3 can be carried out by using one improved extensometer with a conventional extensometer or by using two conventional extensometers, as long as the extensometer(s) can furnish the aforediscussed information.

Without further analysis, the foregoing will so fully reveal the gist of the present invention that others can, by applying current knowledge, readily adapt it for various applications without omitting features which fairly constitute essential characteristics of the generic or specific aspects of our contribution to the art and, therefore, such adaptations should and are intended to be comprehended within the meaning and range of equivalence of the claims.

What is claimed as new and desired to be protected by Letters Patent is set forth in the appended claims:

1. An extensometer for mounting in a bore having an outer end portion at the face of a mass of rock, ore, or similar material and an inner end portion remote from said outer end portion, said extensometer serving to measure the shifting of said material and comprising: an elongated rigid rod extending between said end portions and comprised of a plurality of aligned rod sections and at least one sleeve rotationally rigidly coupling said sections together, said rod having an inner end at said inner end portion and an outer end at said outer end portion; a head fixed on said inner end and integrally formed with a threaded external surface and with a generally conical tip turned away from said outer end, said head being adapted to be fixed at said inner end portion and said tip being adapted to break an adhesive cartridge; a sleeve spacedly surrounding said outer end and adapted to be fixed in said outer end portion remote from said head; a washer surrounding said sleeve and lying against said face; means including a nut threaded on said sleeve and bearing on said washer for pressing same against said face, said outer end projecting through said washer, said sleeve, and said means; and a polygonal formation on said outer end engageable by a tool for rotation of said head.

2. The extensometer defined in claim 1 wherein said sleeve is formed with an external thread and said means is a nut engageable with said thread.

3. The extensometer defined in claim 2 wherein said washer has a central throughgoing hole closely but spacedly surrounding said outer end.

4. Apparatus for measuring the shifting of strata of rock, ore or similar material surrounding an underground excavation and being formed with coaxial first and second holes each opening at a respective face and having an outer end portion communicating with the excavation and an inner portion remote from the respective outer end portion, said apparatus comprising discrete first and second extensometers each in turn comprising an elongated rigid rod extending between the respective end portions of said opening and comprised of a plurality of aligned rod sections and at least one sleeve rotationally rigidly coupling said sections together, said rod having an inner end at the respective inner end portion and an outer end at the respective outer end portion; threaded a head fixed on said inner end and integrally formed with a threaded external surface and with a generally conical tip turned away from said outer end, said head being adapted to be fixed at the respective inner end portion and said tip being adapted to break an adhesive cartridge; a threaded sleeve spacedly surrounding said outer end and adapted to be fixed in the respective outer end portion, remote from said head; a washer surrounding said sleeve and lying against the respective face; means including a nut threaded on said sleeve and bearing on said washer for pressing same against the respective face, said outer end projecting through said washer, said sleeve, and said means; and a polygonal formation on said outer end engageable by a tool for rotation of said head, the displacements of each outer end relative to the respective sleeve being indicative of the changes in distance between the material surrounding the outer end portion and the material surrounding the inner end portion of the respective hole, the displacements of said sleeves relative to each other being indicative of changes in the distance between the outer end portions of the holes, and the displacements of said outer ends with respect to each other being indicative of changes in the distance between said inner end portions.

5. Apparatus as defined in claim 4, wherein the first and second holes are substantially perpendicular to stratification of the material therearound.

6. Apparatus as defined in claim 4 for measuring the shifting of material surrounding an underground excavation and being formed with coaxial third and fourth holes normal to the first and second holes and having outer end portions communicating with the excavation and inner portions remote from the respective outer end portions, said apparatus further comprising third and fourth extensometers respectively corresponding to said first and second extensometers and being installed in said third and fourth holes, respectively.

* * * * *